United States Patent [19]

Bolenbaugh et al.

[11] Patent Number: 4,540,069

[45] Date of Patent: Sep. 10, 1985

[54] DISC BRAKE ASSEMBLY AND DUST SHIELD MEANS THEREFORE

[75] Inventors: Daniel L. Bolenbaugh, South Bend, Ind.; Roger L. Smith, Niles, Mich.

[73] Assignee: Allied Corporation, Morristown, N.J.

[21] Appl. No.: 538,046

[22] Filed: Sep. 30, 1983

[51] Int. Cl.³ .............................................. F16D 65/00
[52] U.S. Cl. ................................................ 188/218 A
[58] Field of Search ................. 188/18 A, 73.1, 218 A

[56] References Cited

U.S. PATENT DOCUMENTS

| | | | |
|---|---|---|---|
| 3,354,992 | 11/1967 | Cook et al. | 188/218 A X |
| 4,005,768 | 2/1977 | Bubnash et al. | 188/218 A |
| 4,164,273 | 8/1979 | McElroy | 188/218 A |
| 4,360,083 | 11/1982 | Weisman | 188/218 A |

FOREIGN PATENT DOCUMENTS

WO81/03530  6/1980  PCT Int'l Appl. ............. 188/218 A

*Primary Examiner*—Duane A. Reger
*Attorney, Agent, or Firm*—Ronald D. Welch; Ken C. Decker

[57] ABSTRACT

A disc brake and dust shield therefore comprises an inboard plate secured to an axle flange and an outboard plate secured to a rotatable hub. The plates cooperates with a wheel assembly to define a cavity receiving and protecting a rotor from contaminants.

4 Claims, 3 Drawing Figures

DISC BRAKE ASSEMBLY AND DUST SHIELD MEANS THEREFORE

This invention relates to a disc brake assembly and dust shield means therefore wherein the dust shield means is used to reduce the incidence of obstacles, such as rocks and gravel, impinging against the rotor of the disc brake assembly.

Heretofore, a dust shield has been used with a disc brake assembly to guard one side of the rotor opposite from a wheel assembly. With the wheel assembly defining apertures for air flow to cool the rotor, it is possible for stones or the like to enter the apertures and damage the rotor even though a single dust shield is disposed adjacent an inboard side of the rotor. If dirt, dust or mud is permitted to settle on the rotor, the friction pads cooperating with the rotor will collect the dirt or dust in the linings so that the life and wear pattern of the linings will be adversely affected. Moreover, if a vehicle is already assembled and in use, any modification to further protect the rotor is time consuming so that a simple solution protecting the rotor is believed desireable.

The prior art is illustrated in U.S. Pat. Nos. 4,155,601 and 4,207,971.

The present invention provides a disc brake assembly and dust shield means therefore comprising a caliper assembly cooperating with a pair of friction pads to engage the latter with a rotor to be braked, the caliper assembly being mounted to an axle flange of a vehicle, the rotor being coupled to a hub which rotates on the axle and carries a wheel assembly for the vehicle, characterized in that said dust shield means comprises an inboard plate attached to said axle flange and extending radially outward to but slightly spaced from said wheel assembly and an outboard plate attached to said hub in order to rotate with said rotor, said outboard plate further comprising two parts extending radially outward from said hub to said wheel assembly, and said inboard plate cooperates with said outboard plate and said wheel assembly to substantially define a cavity for receiving said rotor whereby said rotor and said friction pads are substantially isolated in said cavity from contaminants such as dust, stones and mud on the surface traversed by the vehicle.

It is an advantage of the present invention that the existing wheel assembly is used as part of the boundary for the cavity to protect the rotor.

The present invention will now be described with reference to the accompanying drawings wherein one embodiment of the invention is illustrated.

Figure 1:
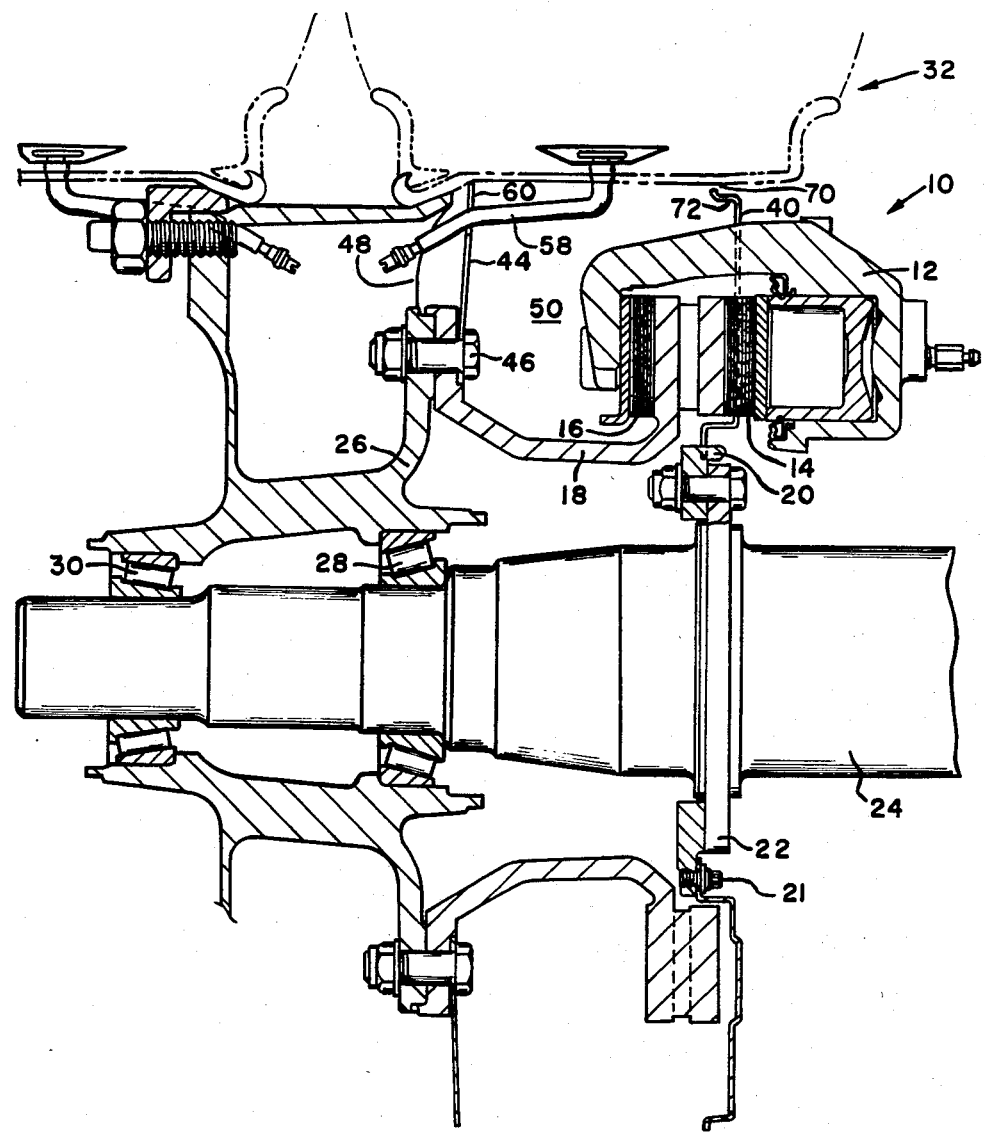
FIG. 1 is a front cross-sectional view of a disc brake assembly.

A disc brake assembly 10 comprises a caliper 12 cooperating with an inboard friction pad 14 and an outboard friction pad 16 in a conventional manner whereby the inboard friction pad is directly engaged with a rotor 18 during braking to move the caliper 12 and outer friction pad 16 to a position engaging the latter with the rotor 18. A torque support 20 is fixed to an axle flange 22 to movably carry the caliper adjacent the rotor 18. The axle 24 extends axially outwardly of the flange 22 to form a bearing support for a hub 26 via bearings 28 and 30. The hub 26 supports a wheel assembly 32 and the rotor 18 so that the wheel assembly 32 and the rotor 18 are braked during braking.

Figure 2:
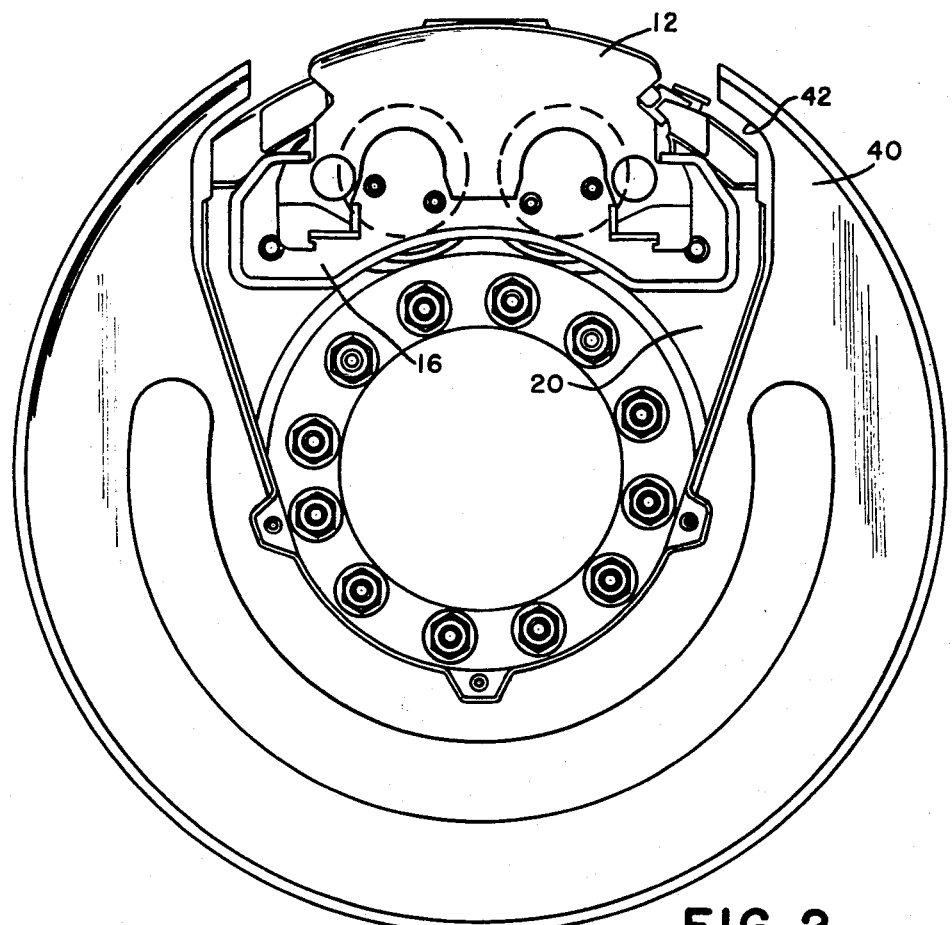
FIG. 2 is a left side view of the inboard plate and disc brake assembly.

In accordance with the invention, an inboard plate 40 is secured to the support 20 via bolts 21. The inboard plate extends radially outwardly to the wheel assembly 32 but remains slightly spaced therefrom as the wheel assembly 32 is rotatable relative to the inboard plate 40. The inboard plate 40 is provided with a cut out 42, see FIG. 2, and the caliper 12 and torque support 20 are disposed within the cut out 42. An outboard plate 44 is secured to the hub 26 via bolts 46 which also secure the rotor 18 to the hub 26. The outboard plate 44 extends radially outwardly to the wheel assembly 32 and is in engagement therewith to cover a plurality of apertures 48 formed in the hub 26. The outboard plate 44 cooperates with the inboard plate 40 and the wheel assembly 32 to define a cavity 50 radially inside the wheel assembly and the rotor 18 is disposed in the cavity 50.

Figure 3:
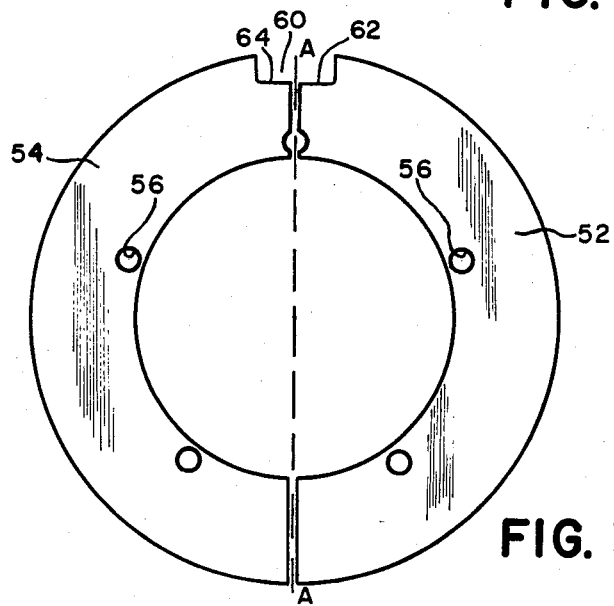
FIG. 3 is a view of the outboard plate before attachment to the hub.

The outboard plate 44 is made from two parts 52 an 54, see FIG. 3, which are symetrical about a verticle axis A—A. The two parts 52 and 54 can be secured to the hub 26 with the rotor already assembled thereto by merely removing bolts 46 and removing the wheel assembly. The two parts 52 and 54 are moved radially inwardly toward each other until openings 56 on both parts are in alignment with bolt holes for bolts 46. The bolts are tightened to secure the outboard plate 44 to the hub. The wheel assembly is reattached to the hub 26 to engage the outboard plate. A valve stem 58 extending radially inwardly of the wheel assembly and axially away from the inboard plate 40 extends through a small radial clearance 60 defined by cutouts 62 and 64 in the parts 52 and 54, respectively.

The inboard plate 40 forms a small spacing 70 with the wheel assembly 32 and the inboard plate 40 is provided with an axially extending leg 72 at the radial outer edge whereby the leg 72 defines the spacing 70.

In view of the foregoing description, it is seen that the outboard plate is rotatable with the wheel assembly while the inboard plate is fixedly secured to the axle flange. The plates cooperate with the wheel assembly at an axially inner and an axially outer position to substantially define a cavity isolating the rotor from the environment of the wheel assembly. As a result, when the wheel assembly is traversing a gravel road or the like, and stirring up dust and stones, the plates will cooperate with the wheel assembly to substantially prevent the ingress of dust and stones into the cavity. The rotor and friction pads associated therewith will be able to perform the braking functions in the absence of undesireable contaminants, such as dust or stones.

We claim:

1. A disc brake assembly and dust shield means therefor comprising a caliper assembly cooperating with a pair of friction pads to engage the latter with a rotor to be braked, the caliper assembly being mounted to an axle flange of a vehicle, the rotor being coupled to a hub which rotates on the axle and carries a wheel assembly for the vehicle, characterized in that said dust shield means comprises an inboard plate attached to said axle flange and extending radially outward to but slightly spaced from said wheel assembly and an outboard plate attached to said hub in order to rotate with said rotor, said outboard plate further comprising two parts extending radially outward from said hub to said wheel assembly, the radially outer periphery of said outboard plate engaging said wheel assembly and said inboard plate cooperates with said outboard plate and said wheel assembly to substantially define a cavity for receiving said rotor whereby said rotor and said friction pads are substantially isolated in said cavity from contaminants such as dust and stones on the surface traversed by the vehicle.

2. The disc brake assembly and dust shield means therefore of claim 1 in which said two parts cooperate with each other to define a clearance for receiving a portion of said wheel assembly.

3. The disc brake assembly and dust shield means therefore of claim 1 in which said inboard plate is provided with an axially-extending leg adjacent said wheel assembly to define a small spacing with said wheel assembly.

4. The disc brake assembly and dust shield means therefore of claim 1 in which said inboard plate cooperates with said wheel assembly at an axial location substantially in alignment with said friction pads and said outboard plate cooperates with said wheel assembly at an axial location spaced axially outwardly from said inboard plate.

* * * * *